US007483851B1

(12) United States Patent
Brixius et al.

(10) Patent No.: US 7,483,851 B1
(45) Date of Patent: Jan. 27, 2009

(54) METHOD AND SYSTEM FOR VENTURE CAPITALIST DISTRIBUTION OF STOCK

(75) Inventors: John K. Brixius, New York, NY (US); James G. Schaad, Marlboro, NJ (US); David W. George, New York, NY (US); Robert J. Dent, Palo Alto, CA (US)

(73) Assignee: Goldman Sachs & Company, New York, NY (US)

( * ) Notice: Subject to any disclaimer, the term of this patent is extended or adjusted under 35 U.S.C. 154(b) by 1317 days.

(21) Appl. No.: 10/043,554

(22) Filed: Jan. 11, 2002

Related U.S. Application Data

(60) Provisional application No. 60/261,131, filed on Jan. 11, 2001.

(51) Int. Cl.
*G06Q 40/00* (2006.01)
(52) U.S. Cl. .................................................. 705/37
(58) Field of Classification Search ................ 705/37
See application file for complete search history.

(56) References Cited

U.S. PATENT DOCUMENTS

| | | | | |
|---|---|---|---|---|
| 5,950,176 | A * | 9/1999 | Keiser et al. | 705/36 R |
| 6,014,643 | A * | 1/2000 | Minton | 705/36 R |
| 6,173,270 | B1 * | 1/2001 | Cristofich et al. | 705/37 |
| 6,192,347 | B1 * | 2/2001 | Graff | 705/36 R |
| 6,246,994 | B1 * | 6/2001 | Wolven et al. | 705/14 |
| 6,269,346 | B1 * | 7/2001 | Cristofich et al. | 705/36 R |
| 6,278,982 | B1 * | 8/2001 | Korhammer et al. | 705/36 R |
| 2001/0054022 | A1 * | 12/2001 | Louie et al. | 705/38 |
| 2002/0038275 | A1 * | 3/2002 | Brixius | 705/37 |
| 2002/0042771 | A1 * | 4/2002 | Shields et al. | 705/37 |
| 2002/0087373 | A1 * | 7/2002 | Dickstein et al. | 705/7 |
| 2005/0055321 | A1 * | 3/2005 | Fratkina et al. | 706/45 |
| 2005/0131788 | A1 * | 6/2005 | Verdonik | 705/35 |

OTHER PUBLICATIONS

See Barron's Financial Guides, Dictionary of Finance and Investment Terms, Copyright 1998.*

* cited by examiner

*Primary Examiner*—Hani M Kazimi
*Assistant Examiner*—Michael R Zecher
(74) *Attorney, Agent, or Firm*—Lee & Hayes, PLLC

(57) ABSTRACT

A method for facilitating the distribution of physical restricted securities to a set of participants comprises receiving from an originating entity, such as a venture capitalist, a distribution package. A transfer agent is given temporary custody of the restricted securities and delivery instructions are provided to the transfer agent. Because the transfer agent has custody of the securities while they are still in the name of the originating entity, it can perform distributions of the restricted securities in accordance with incrementally delivered instructions and does not need to terminate the entire distribution if the instructions for a particular participant are incomplete or inconsistent. A system for gathering distribution instructions from participants and delivering the instructions to a facilitator is also disclosed.

21 Claims, 17 Drawing Sheets

FIG. 12

METHOD AND SYSTEM FOR VENTURE CAPITALIST DISTRIBUTION OF STOCK

CROSS-REFERENCE(S) TO RELATED APPLICATIONS

This application claims priority under 35 U.S.C. § 119 to U.S. Provisional Application Ser. No. 60/261,131 entitled "Method And System For Venture Capitalist Distribution Of Stock", filed on Jan. 11, 2001.

This application is also related to U.S. patent application Ser. No. 09/751,721 entitled "Restricted Securities Processing" and filed on Dec. 29, 2000, the entire contents of which is hereby incorporated by reference.

COPYRIGHT STATEMENT

This document contains material which is subject to copyright protection. The applicant has no objection to the facsimile reproduction of this patent document, as it appears in the U.S. Patent and Trademark Office patent file or records or in any publication by the U.S. Patent and Trademark Office or counterpart foreign or international instrumentalities. All copyright rights whatsoever are otherwise reserved.

FIELD OF THE INVENTION

The present invention relates to a method and system for providing distribution of physical securities, such as restricted securities, and more particularly, to an improved method of distributing such securities in accordance with terms generated by a venture capital firm.

BACKGROUND

A common event in the finance and securities fields is distribution of securities from venture capital firms to specified participants. Typically, the distribution is of a restricted security which must be represented by physical documents. As a result, the distribution cannot be performed using entirely electronic mechanisms and instead requires comparatively inefficient manually intensive and non-standard processes which may take several weeks to complete.

When a venture capital entity (VC) wants to distribute restricted stock, the conventional practice is to first notify a facilitator for the distribution. The VC then delivers one or more physical share certificates to the facilitator. The certificates bear legend that the shares are restricted. Also printed on the security is the party to whom the security is registered, which is this case is the VC, as well as the number of shares registered to the party. The VC also provides allocation instructions identifying the limited partner participants in the distribution and the number of shares each participant should receive. Depending on the size of the distribution, the number of participants can be in the hundreds. The total number of shares referenced in the facilitator's instructions must equal the total number of shares being distributed as detailed in a required legal opinion. In addition, supporting documentation, such as stock powers, corporate resolutions, or other related documentation, is supplied. The opinion of counsel must address the total number of shares of the distribution, reference each of the participants by name, and list the number of shares that each participant will receive.

After receiving this information, the facilitator generally has two choices in distributing the securities. The first choice is to simply distribute the shares to the limited partners based solely on the instructions from the VC. The second approach is to first contact the limited partners to notify them of the distribution and get the distribution information from them directly.

The first approach is problematic in that the information from VCs is typically obtained at the fund pledge stage. The distribution can occur years after this date and the VC information is often incorrect. As a result, the distributed securities often do not reach the LP. Another problem with this approach is that, with the passage of years, the LP may have changed its mind as to what to do with the securities. Additionally, the first approach only involves sending a physical certificate to a predetermined destination—usually the LP's home address or broker—and does not provide advance notification which would allow the LP to sell the securities quickly. Because the stock price typically falls 20% or more within hours after a VC distribution takes place, the LP can suffer a significant economic loss.

The second approach is generally preferred by the limited partners. In using the second approach, the facilitator must obtain instructions from each of the participants detailing what the participant would like to do with the stock from the distribution, such as retain it in an account with the facilitator, transfer it to an account at a different broker or bank, or sell it. Getting instructions from all of the participants can be a time consuming procedure, particularly when incomplete contact information has been provided or a participant is unavailable. In addition, when the instructions result in a transfer of ownership of the stock (e.g., gifting or sales), additional legal opinions for those transfers must be obtained.

After instructions have been obtained from every participant, the participant or recipient names may need to be reformatted to conform to required industry standards and fanfolds of written or hardcopy instructions for each participant created. The instructions are processed to reflect that shares are showing on the books of the facilitator and the records in the transfer location. A copy of each of the fanfolds is attached to the certificate and the package is surrendered to a transfer agent for the distribution.

The transfer agent verifies that the received instructions are complete and, in particular, that the legal opinion agrees in every detail with the instructions furnished by the VC regarding the distribution. If the instructions are not completely acceptable, i.e., having good registrations and balanced share amounts with stock certificate versus fanfold instructions, etc., the entire transfer is rejected by the transfer agent and referred back to the facilitator for correction. Because of the need to wait until instructions from all participants have been obtained coupled with this cycle of rejection and correction, the processing time for the distribution can be several weeks.

Once the transfer agent verifies that the package (containing shares of the restricted stock, supporting documents, distribution instructions, and opinion of counsel) which has been surrendered to it is complete, the original stock certificate is canceled and one or more new physical certificates are created for each of the participants of the distribution. The new certificates have the appropriate number of shares and bear a restricted legend. The issuance or creation of the physical certificates usually requires seven to ten days and can take longer.

The securities are then returned to the facilitator. The facilitator checks each certificate to insure that it was registered correctly and for the correct number of shares. If any of the shares are to be sold or delivered to another bank or broker, the facilitator is responsible for completing that transaction by obtaining the necessary approvals, verifying a proper legal opinion approving the sale exists, etc. Delivered shares are then shipped to the designated address. Shares to be sold must be properly endorsed or appropriate stock power obtained if needed. This can also delay the settlement process. The sold shares are then re-surrendered to the transfer agent for re-registration into the name of the facilitator but without legend. The number of shares to be sold must match the amount referenced on the legal opinion and, if the amounts do not match, the transfer agent may not complete the transfer. This process can typically require seven to ten days or longer. The process can be further delayed if the facilitator receives instructions to sell shares while the shares are in transfer from the VC to the various limited partner participants since amended instructions can complicate the process and result in errors from miscommunications between the various parties involved.

Upon completion of the transfer, the shares are again returned to the facilitator which, in turn, checks each certificate for details such as registration, share amount, and issuance without legend to insure that the certificate is properly issued. The certificates can then be surrendered to the Depository Trust Company (DTC) for deposit to satisfy a fail to deliver commitment.

As will be appreciated, the conventional process for the distribution of restricted securities is cumbersome and time consuming. Distribution to participants who provide instructions immediately is delayed until the valid instructions have been received from every participant. Once the package has been provided by the facilitator to the transfer agent, even a minor error with regard to one participant will result in the entire package being returned to the facilitator for correction, further delaying distribution. In addition, when distributed shares are sold, the distributed shares provided by the transfer agent and accompanying documentation must again be returned to the transfer agent to reissue the shares without legends. As a result, it can take some time for a distribution to be completed and even participants who provide prompt instructions may need to wait several weeks before receiving the stock or proceeds from a sale.

Accordingly, there is a need for a method and system to more efficiently process the issuance of restricted securities from a VC to one or more limited partner participants. It would be a further advantage if such a method and system involved less manual intervention and provided for completion of the transaction in a shorter period of time than conventional processes.

SUMMARY OF THE INVENTION

According to one aspect of the invention, the role of a transfer agent (TA) in a distribution of restricted securities by a venture capital agency (VC) is augmented by giving the TA custody of the physical securities which are to be distributed. Because the TA has custody, it is not limited to a single transfer for the distribution which can occur only after instructions from all participants have been received and balanced against the offering. Instead, the TA can perform incremental distributions for particular participants as instructions are provided.

In particular, when instructions for at least some of the participants have been received and approved by the TA, the TA cancels the original certificate from the VC and generates new certificates for those participants who are retaining their stock. If a participant is selling or transferring the stock from the distribution, the TA does not need to generate a certificate and return it to the facilitator for processing but, instead, can perform electronic transfers, distributions, or issue the certificate in the name of the buyer as appropriate. If some shares have not been distributed, the TA generates a new certificate for the VC which indicates the remaining number of shares after the incremental distribution. More generally, for all shares for which the VC has received instructions, the VC in some format transfers the shares to a custodian different from itself.

Advantageously, by providing the TA with custody of the shares to be distributed, distributions to participants who have provided instructions can be performed immediately. Furthermore, when a participant is not retaining their portion of the distribution, e.g., they are selling, gifting, or transferring their shares, the involvement of the facilitator in the post-distribution transaction is reduced, decreasing the time needed for the transfer or sale to be completed.

A further aspect of the invention is an automated system for improving the efficiency with which the facilitator processes the distribution. The system comprises a centralized database system and accompanying input and output functionality through which the facilitator can verify information provided by the VC regarding the various participants, coordinate the contacts required to obtain instructions in a manner which reduces or eliminates repeat calls to the same contact, and automatically generate incremental instruction reports to be given to the TA responsible for a particular distribution.

BRIEF DESCRIPTION OF THE FIGURES

The foregoing and other features of the present invention will be more readily apparent from the following detailed description and drawings of illustrative embodiments of the invention in which:

FIG. 12 is a sample transfer screen; and

DETAILED DESCRIPTION OF THE PREFERRED EMBODIMENTS

Figure 1:
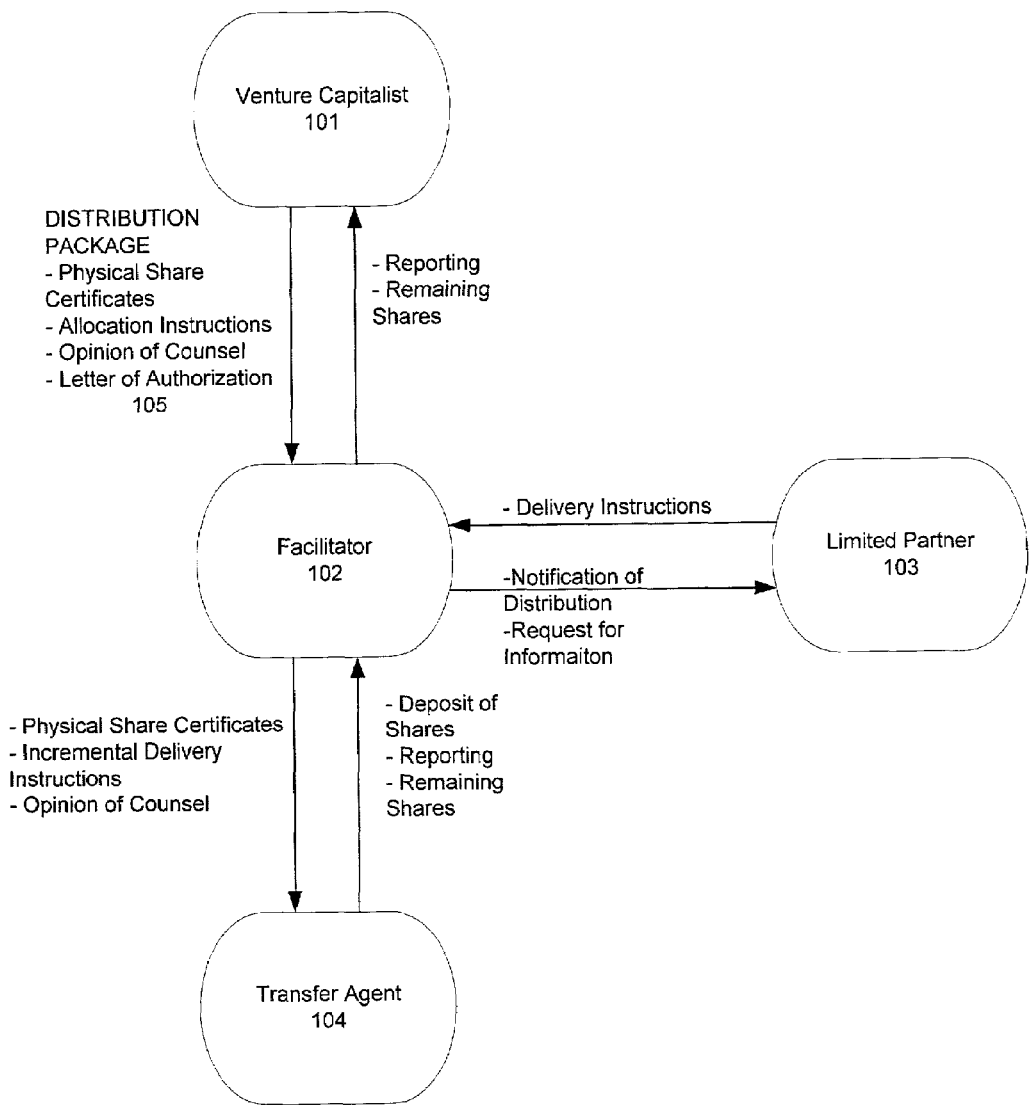
FIG. 1 is a block diagram of the major entities that are generally involved in a distribution of restricted stock in accordance with the invention as well as information flows associated with such a distribution.

Referring to FIG. 1, there is shown a block diagram illustrating major entities that are generally involved in a distribution of restricted stock by an originating party, such as a venture capitalist entity (VC) 101. Information flows associated with such a restricted stock distribution are also shown. The VC 101 begins the distribution process by notifying a facilitator 102, such as a bank, broker, or other financial institution, of the VC's desire to issue restricted stock or other securities. The VC 101 supplies to the facilitator a distribution package which can include, but is not limited to, one or more of physical share certificates, allocation instructions, opinion of counsel, a letter of authorization, and other items which can help execute the distribution. These items can alternatively be forwarded separately and a "distribution package" format is not required. In addition to providing initial distribution instructions to the transfer agent 104, the facilitator 102 can also provide the stock in negotiable form, stock power with signature guaranteed, and a legal opinion regarding subsequent transfers or sales of distributed stock.

The facilitator 102 notifies the limited partners (LP) 103 or other participants identified by the VC of the pending distribution. In addition, if the facilitator 102 does not have standing instructions for a participant, they can request instructions from that LP 103 or a designated contact how the allocated shares should be distributed.

According to one aspect of the invention, the facilitator 102 supplies a transfer agent (TA) 104 with custody of the physical share certificate(s) provided by the VC as well as an opinion of counsel relating to the entire distribution. The facilitator also provides the TA with incremental instructions for the distribution of securities to one or more LPs 103 as instructions become available. It should be noted that approval from the VC may be required to transfer custody of the securities provided by the VC from the facilitator to the TA. The TA 104, in turn, sends to the facilitator 102 a receipt for the deposit of shares, reports relating to the distribution, and/or shares remaining after all feasible distributions have been carried out. The facilitator 102 can also report the status of the distribution to the VC 101 and forward remaining shares to the VC 101 if desired.

According to a further aspect of the invention, a computerized mechanism for storing and manipulating data, such as, for example, a spreadsheet or other electronic data file, can be utilized to track information relating to the LPs and provide incremental instruction information to the TA. This is discussed in more detail below.

Figure 2:
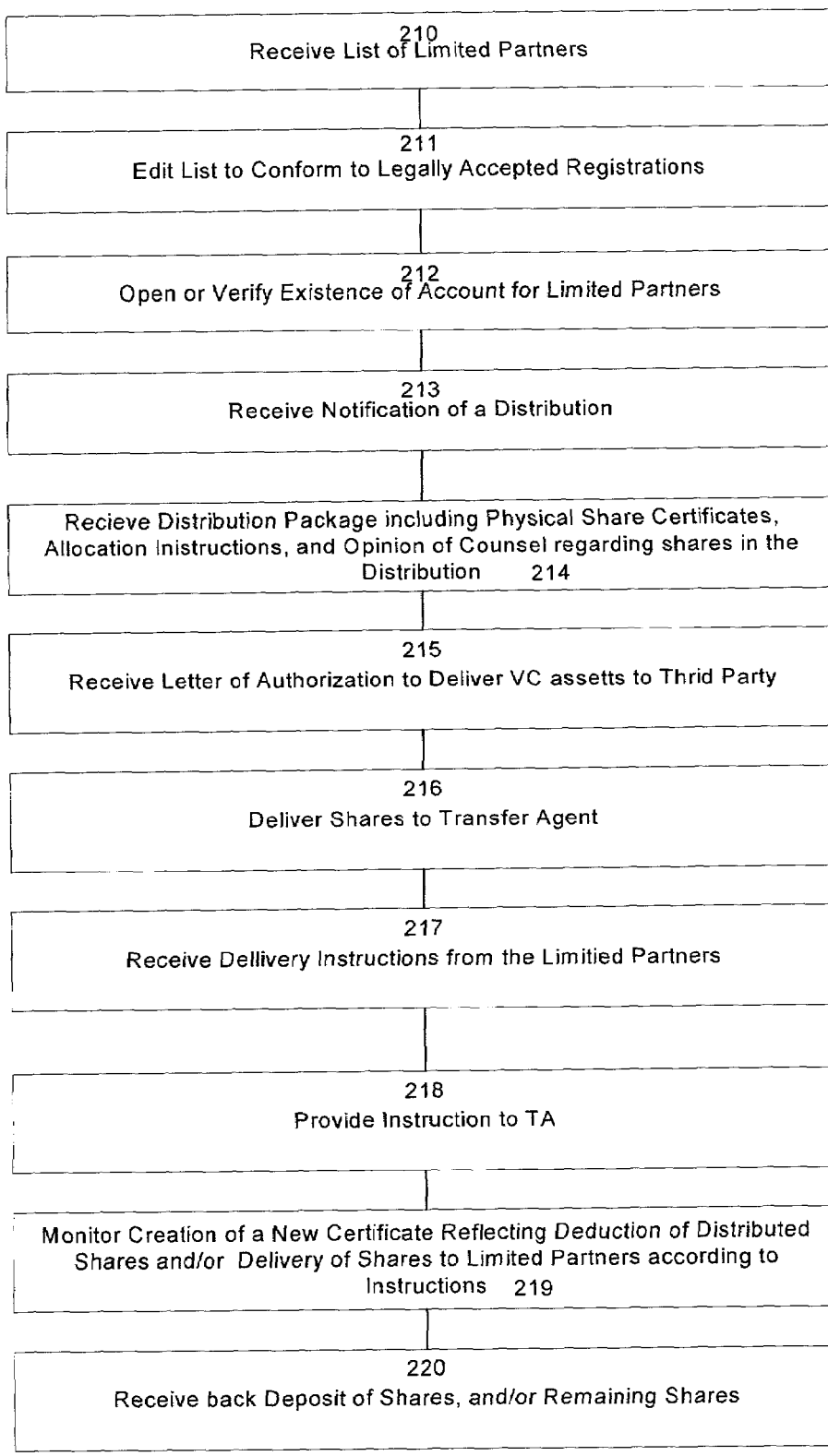
FIG. 2 is a flow diagram of an exemplary method embodying the present invention.

Turning to FIG. 2, there is shown a flow diagram of an exemplary method embodying aspects of the present invention. As preparation for distributions related to a particular stock, a facilitator 102 receives a list of LPs 103 participating in a distribution from a VC 101 (step 210). The facilitator 102 can edit the list to conform to legally accepted registrations (step 211). Editing 211 generally includes verifying that information, such as the name given for the participating LPs, is consistent with other documentation. The facilitator can also open an account for each LP 103 or verify that the LP has an already existing account (step 212).

The facilitator 102 can also receive a separate notification of a distribution (step 213) pertaining to the list of LPs as well as a separate distribution package from the VC 101 (step 214). Generally, the distribution package 105 comprises one or more physical share certificates. The certificates will bear a legend and can also include supporting documentation, such as stock powers, corporate resolutions, or other related documents. The distribution package can further include a letter of authorization referencing the allocation instructions that represent a number of shares for each LP 103 participating in the distribution. Alternatively, such additional information can be provided apart from the distribution package. The number of LPs participating can vary and participants numbering in the hundreds is not uncommon. The total number of shares referenced in the instructions provided by the VC should equal the total number of shares referenced on the legal opinion.

The opinion of counsel relating to the total number of shares in the distribution can also be part of the distribution package, or be forwarded separately. The opinion should reference by name each of the participating LPs 103 and the number of shares each will receive. The opinion should agree with the details contained in the instructions furnished in the letter of distribution.

In addition, and in accordance with a feature of the invention, the VC can also provide the facilitator 102 with a letter authorizing delivery of VC 101 assets into the custody of a third party (step 215). In this case, the third party will be the TA 104 and the assets transferred will include the shares of restricted stock. With such authorization, the facilitator 102 can deliver the physical shares of stock represented by the certificates into the custody of the TA (step 216).

Accordingly, the TA 104 will be acting in two capacities—in the traditional capacity of transfer agent and also as a temporary custodian until the shares are distributed. As a result, when the stock is surrendered to the TA, it is not initially in an "in transfer" state from the VC 101 to the LP 103. Historically, if the TA were acting in its traditional role, then receipt of the shares would need to be accompanied by a complete set of instructions relating to the distribution. However, and in accordance with this aspect of the present invention, because the TA 104 has custody of the shares, it is free to act on partial instructions relating to the distribution. As a result, the TA can expedite distribution to those LPs 103 from which instructions are received in a timely manner.

Once the facilitator has received the list of participating LPs from the VC, the facilitator can contact the various participants (or their designated contacts) to get instructions about the delivery of distributed securities. (Step 217). For example, an LP can have the certificate delivered to him, retain the securities in an account with the facilitator, transfer the securities to a different account, or sell the securities. When instructions are received, the instructions are conveyed to the TA, either as required, on a periodic basis such as daily, or delivered in real time as they are received at the facilitator (step 218).

As the TA receives instructions, it can act on them and perform a partial or incremental distribution of the securities in accordance with the instructions. For example, the TA can act on a periodic basis, such as daily, to distribute those securities for which instructions have been received and continue to house the remaining securities in the name of the VC while the TA awaits further delivery instructions. The facilitator can monitor the actions of the TA through reports received, via an online system, by voice communications, or through other communications vehicles (step 219). Actions which are monitored can include the creation of new certificates reflecting deductions of distributed shares and delivery of shares to limited partners according to instructions given. In addition, the facilitator can receive from the TA distributed shares for deposit or shares that remain subsequent to a distribution, as may result when a facilitator is unable to obtain instruction from an LP. (Step 220). Typically, such shares will remain in the name of the VC in the custody of the TA until the LP participant responds. If there is no response within a specified period of time, the distribution is generally closed and the shares surrendered back to the VC. When the distribution is closed, no shares remain in the custody of the TA.

Figure 3:
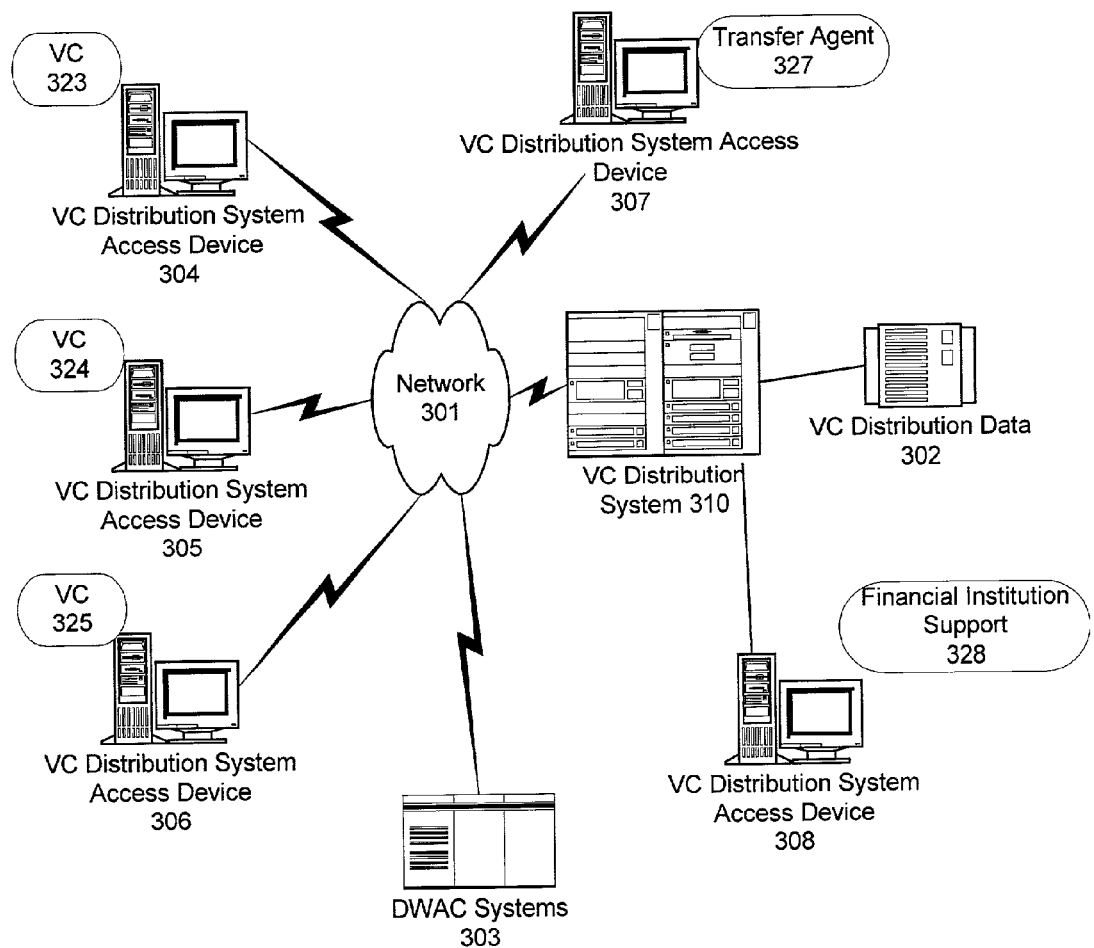
FIG. 3 is a network diagram illustrating one embodiment of a system for implementing present invention.

According to another aspect of the invention, the role of the facilitator is aided, in whole or part, through the use of a computerized VC distribution system comprising a shared database and which can be accessed by local and remote devices using appropriate system access devices and software. Turning to FIG. 3, there is shown a network diagram illustrating one embodiment of a system of this type. In this embodiment, an automated system is utilized for processing the distribution of restricted securities from a VC 101. The VC processing system comprises a VC Distribution System 310 which is accessible via a network 301, such as the Internet, or a private network. Participating VCs 323-325, a participant TA 327, a participating facilitator 328, and other entities participating in a VC distribution of restricted securities can access the system via a suitable network access device 304-308 and receive, input, transmit, or view information processed in the VC Distribution System 310. In addition, the system can provide access to Deposit Trust Companies DWAC 303 to permit electronic delivery of shares by the TA, facilitator, or other party to a designated recipient.

Each of the network access devices can include a processor, memory, a user input device, such as a keyboard or mouse, and a user output device, such as a display screen or printer. The network access devices 304-308 communicate with the VC Distribution System 310 to access stored data. The network access devices 304-308 can interact with the host as if the host were a single entity in the network 301. However, the VC Distribution System 310 can include multiple processing and database sub-systems that can be geographically dispersed throughout the network 301, such as cooperative or redundant processing or database servers. In some implementations, groups of network access devices 304-308 can communicate with the VC Distribution System 310 through a local area network. Appropriate database and workflow management software for use in managing such a distributed system will be known to those of skill in the art.

The VC Distribution System 310 has access to one or more databases 302 used to store VC distribution related data and which can also include other information. The VC Distribution System 310 includes appropriate database screens and other program modules to permit users to interact with and gather data from a participant VC 323-335, a participant TA 327, a participating facilitator 328, or other entity participating in a VC distribution of restricted securities. Data gathered from various sources can be used to further facilitate a distribution.

Typically, a user will access the VC Distribution System 310 using VC software executed on a local or remotely located network access device 304-308. The VC software can include a generic "web" or hypertext markup language (HTML) browser, such as Netscape Navigator or Microsoft Internet Explorer. The VC software can also be implemented using a proprietary browser or other host access software. In some cases, an executable program, such as a Java™ program, can be downloaded from the VC Distribution System 310 to a VC network access computer 304-307 and executed at the VC computer 304-307 as part of the VC distribution software. Other implementations include proprietary software installed from a computer readable medium, such as a CD-ROM. The system functionality can therefore be implemented in digital electronic circuitry, computer hardware, firmware, software, or in combinations of the above. Apparatus of the invention can be implemented in a computer program product tangibly embodied in a machine-readable storage device for execution by a programmable processor. Method steps of the invention can be performed by a programmable processor executing a program of instructions to perform functions of the invention by operating on input data and generating output.

Automated process flows that allow for the transfer of documents through an electronic communications network eliminate many manual and time consuming steps formerly required to effect a transaction involving restricted securities. In addition, electronic signatures can be used to further expedite the approval of legally binding documents. Management of the various requirements to trade and process the restricted securities, such as receipt of opinions, etc., is preferably performed by an automated system or a variation thereof, such as described in U.S. patent application Ser. No. 09/751,721, entitled "Restricted Securities Processing" and filed on Dec. 29, 2000.

Figure 4:
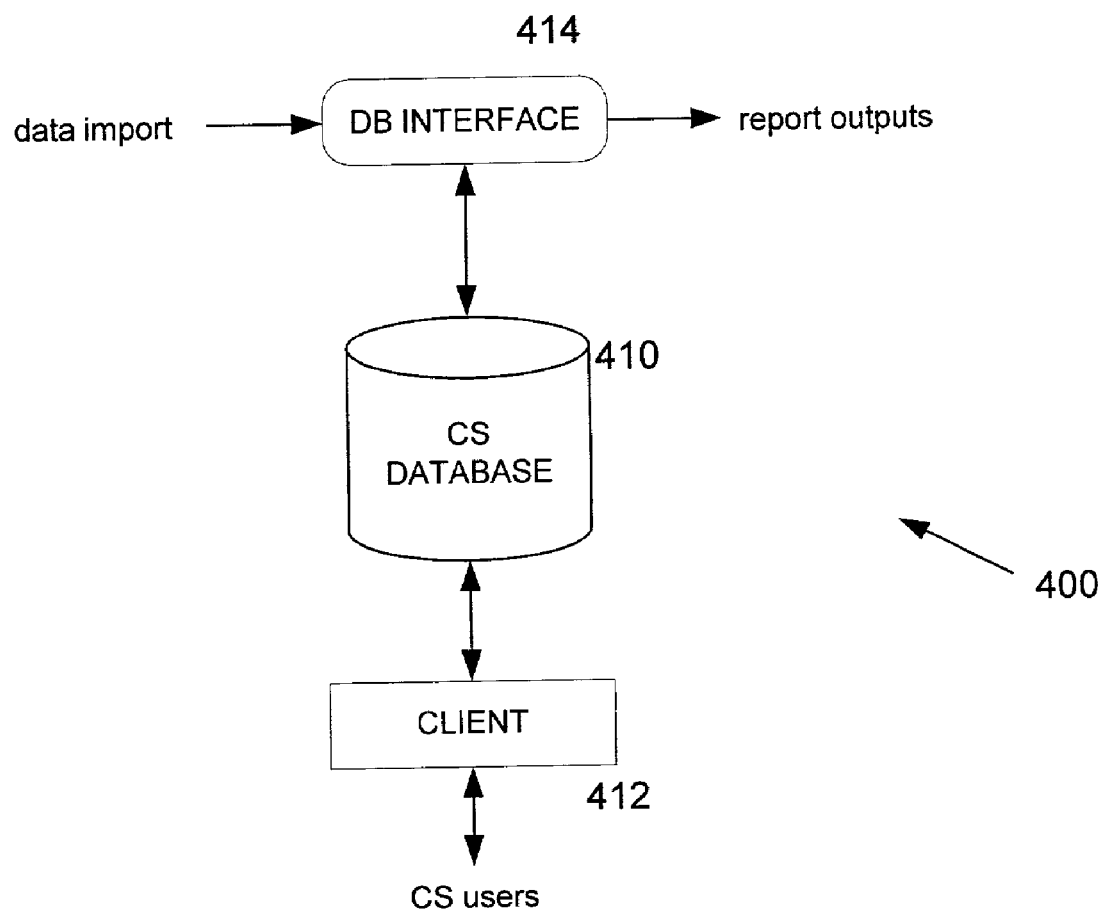
FIG. 4 is a block diagram of the major components of a venture capital and corporate services system configured to facilitate the management of distributions in accordance with the present invention.

A preferred functional implementation of the system illustrated in FIG. 3 will now be discussed with reference to FIG. 4. FIG. 4 shows a high level block diagram of the major components of a venture capital and corporate services (VCS) system 400 configured to facilitate the management of venture capital distributions in accordance with the method disclosed above. Advantageously, the system 400 allows for scalability of distribution operations by providing a real-time view of the distribution process. Users can allocate notification tasks more efficiently among team members by minimizing the transmission of data, such as spreadsheets, between the VCS desk and the venture capital firm and between the VCS desk and the client services organization, by providing automatic communication features with assigned sales staff for covered participants, and by enabling automatic control and compliance tasks.

The system 400 is comprised of three main components: a back-end CS database 410, a front-end client 412, and a database interface 414. The database 410 is preferably a Sybase server located in a centralized data center. The client 412 is preferably a Microsoft Visual Basic client which comprises multiple database entry screens or modules implemented using Visual Basic controls through which users can view, edit, and act on the database contents. The interface 414 is preferably a Microsoft Access interface which is configured to provide reporting and spreadsheet or other data import features. Other I/O mechanisms can also be used to extract information from the database and provide it to downstream automated or other processes. In addition, access to table data in the database in the event of an application failure is possible through the interface 414.

Figure 5:
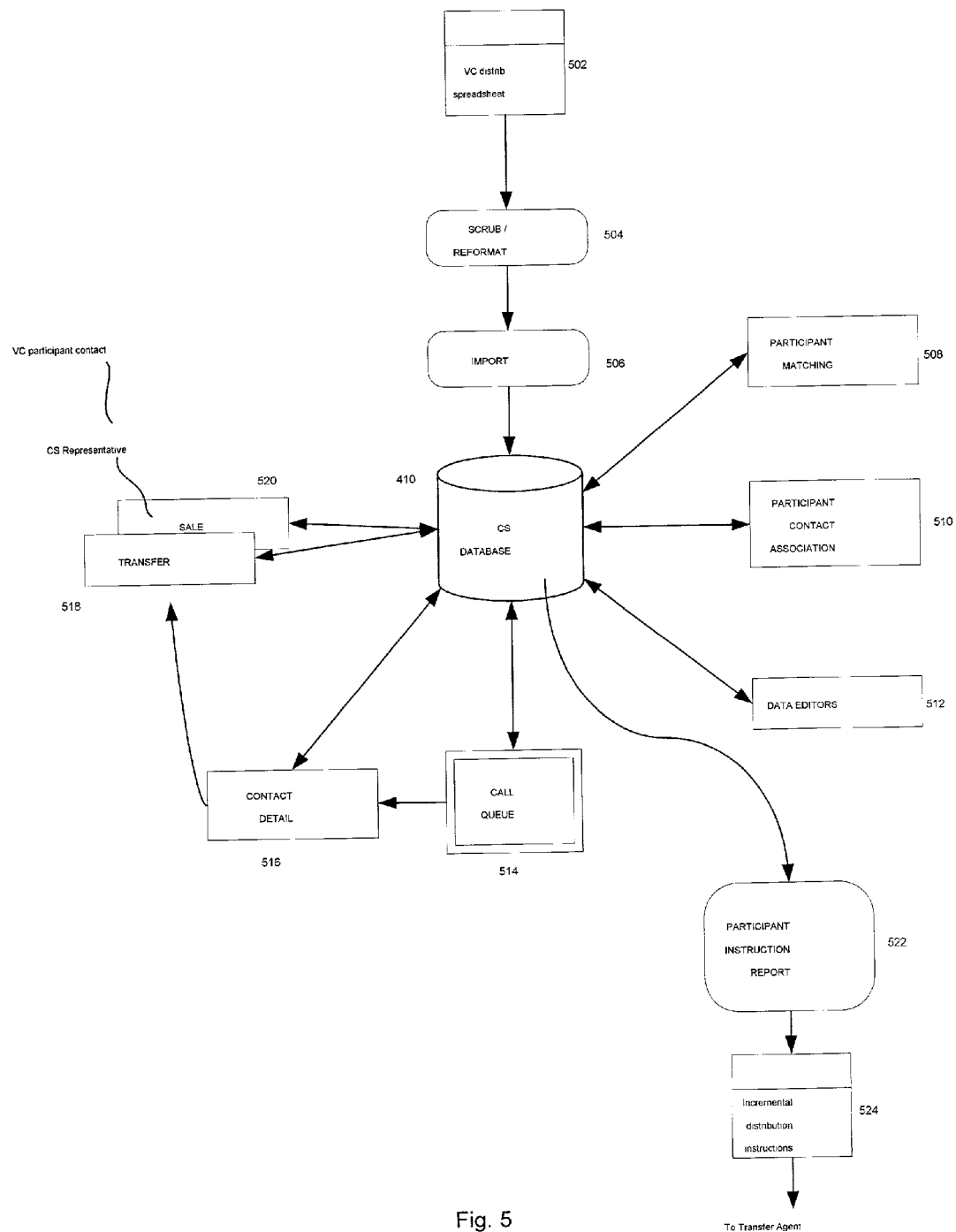
FIG. 5 is an illustration of the various major database screens and input and output functions of a preferred embodiment the system of FIG. 4.
Figure 6:
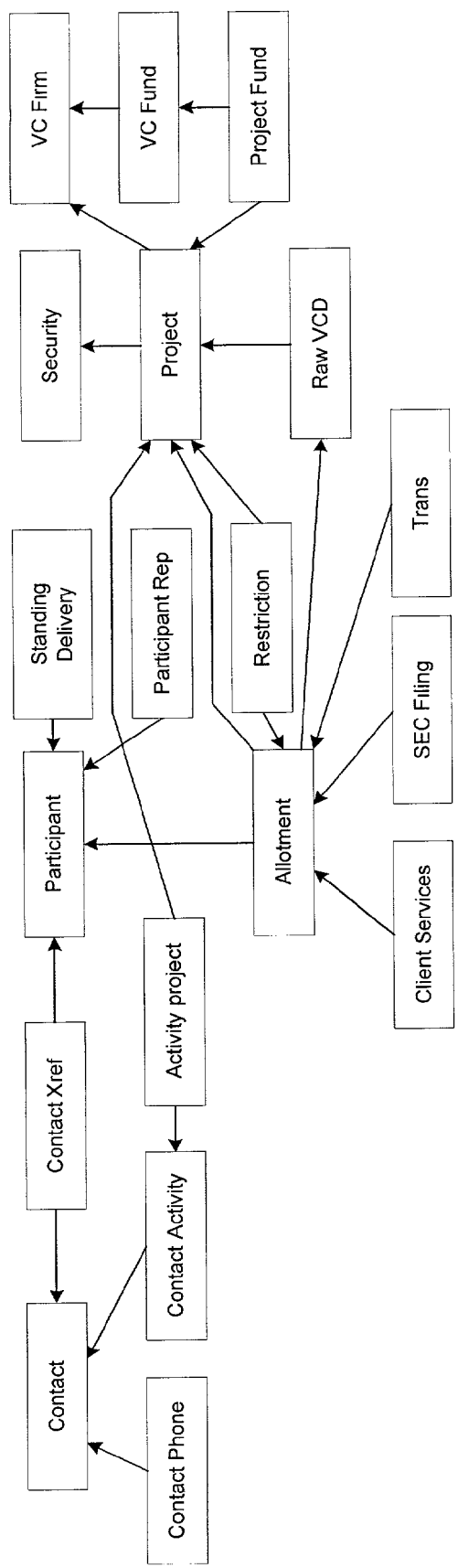
FIG. 6 is an illustration of a set of tables forming one embodiment of the Tdatabase of FIG. 4.

The various major database screens and input and output functions are illustrated in FIG. 5. Operation of these screens will now be discussed in conjunction with the sequence of actions during a VC distribution. While the actions are generally performed in the sequence discussed, the order can vary. In addition, some actions can be combined or divided in manners which differ from the most preferred embodiment discussed herein while other actions may be omitted if appropriate under the circumstances. The CS database 410 can be comprised of multiple different databases or tables. The database definition can vary according to implementation. A preferred set of database tables which comprise the CS database 410, including linkages between the databases, is shown in FIG. 6, discussed below.

Turning to FIG. 5, the VC initially provides notice to the facilitator that a distribution is forthcoming and a distribution data file, such as a spreadsheet 502, is provided from the VC in electronic form. The spreadsheet generally contains, for each participant in the distribution, a Tax ID number (TIN), such as a social security number, the name of participant, and the number of shares to be distributed to that participant. Additional information, such as a cost basis for the distribution, the name of the fund from the VC which is paying the distribution, a participant address, as well as other contact information for the participant, such as telephone and fax number, e-mail, etc., can also be provided.

First, the VC distribution project is defined in the system. Next, the VC spreadsheet 502 is imported into the database. Ideally, the information received from the VC will be complete and will correspond to the format and content of information already present in the CS database 410. However, this is frequently not the case. Thus, after the new VC distribution has been defined, the VC distribution spreadsheet 502 is "scrubbed" to format the data into a form which corresponds to the format of the CS database 410 and also to ensure that all required data files are present. Other basic integrity checking can also be performed. A scrub/reformat module 504 can be provided to perform this process.

After the scrubbing process is complete, the VC spreadsheet data is imported into the CS database, e.g., by using an import function 506. Although the imported data is in the proper format, often the VC provides incomplete, incorrect, or inconsistent information relative to information which may already be present in the CS database, such as information for participants which already have accounts at the facilitator. Thus, rather than being loaded directly into the main operating databases, the data is imported into a Raw VCD database.

After importing the raw data, a participant (LP) matching process is initiated during which participants (LPs) indicated by the VC are matched to account and historical participant information already present in the database. During participant matching, existing records in the CS database 410 are matched with the VC participants using a common reference number, such as the TIN. When the matching process is first initiated, an automatic procedure can be implemented which identifies all new and prior records with a matching TIN, indicates where there are differences between the raw and existing records, such as a different address or name spelling, as well as indicating those participants which are new to the system.

Figure 7A:
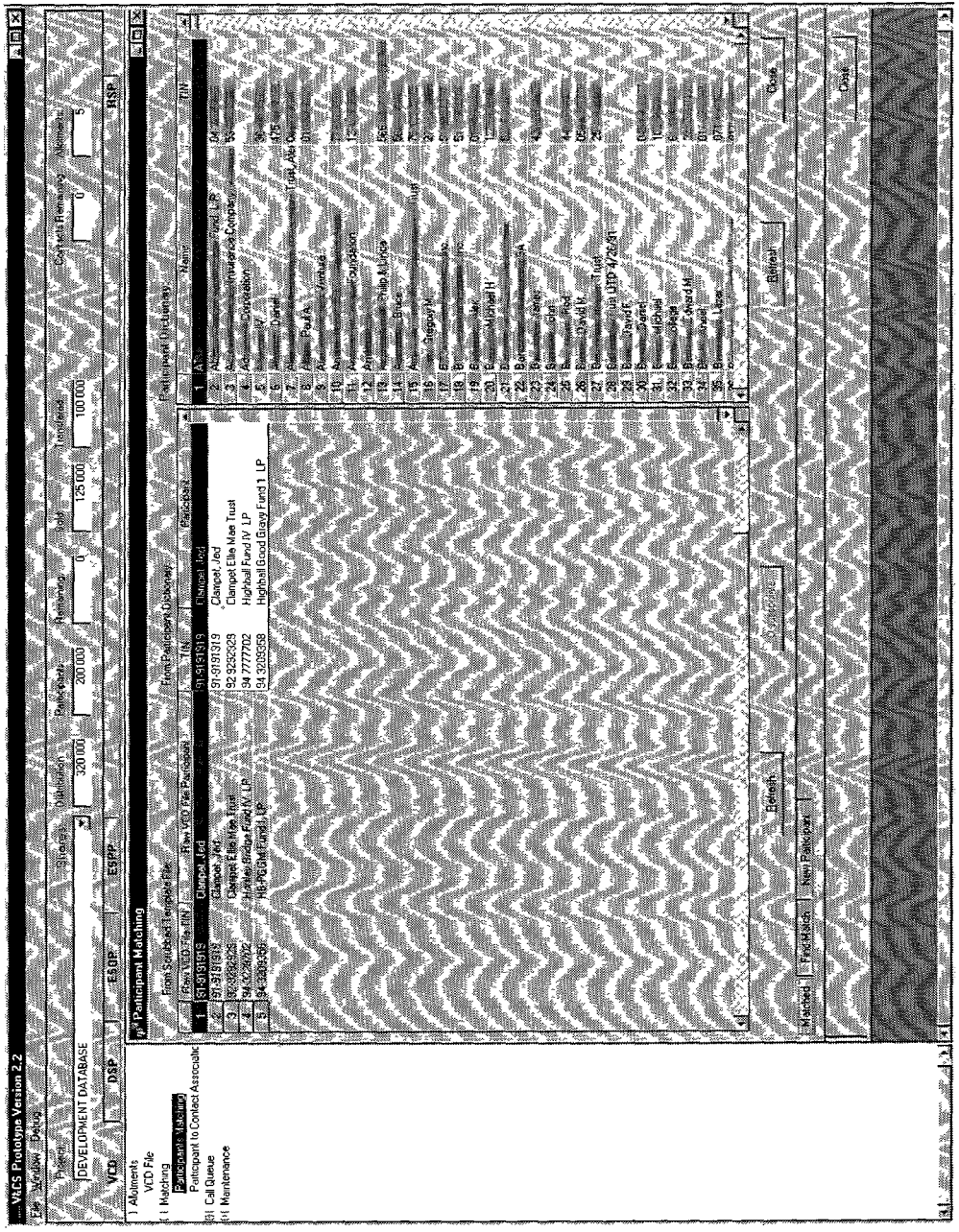
FIGS. 7a-c are sample screens used during a participant matching process.
Figure 7B:
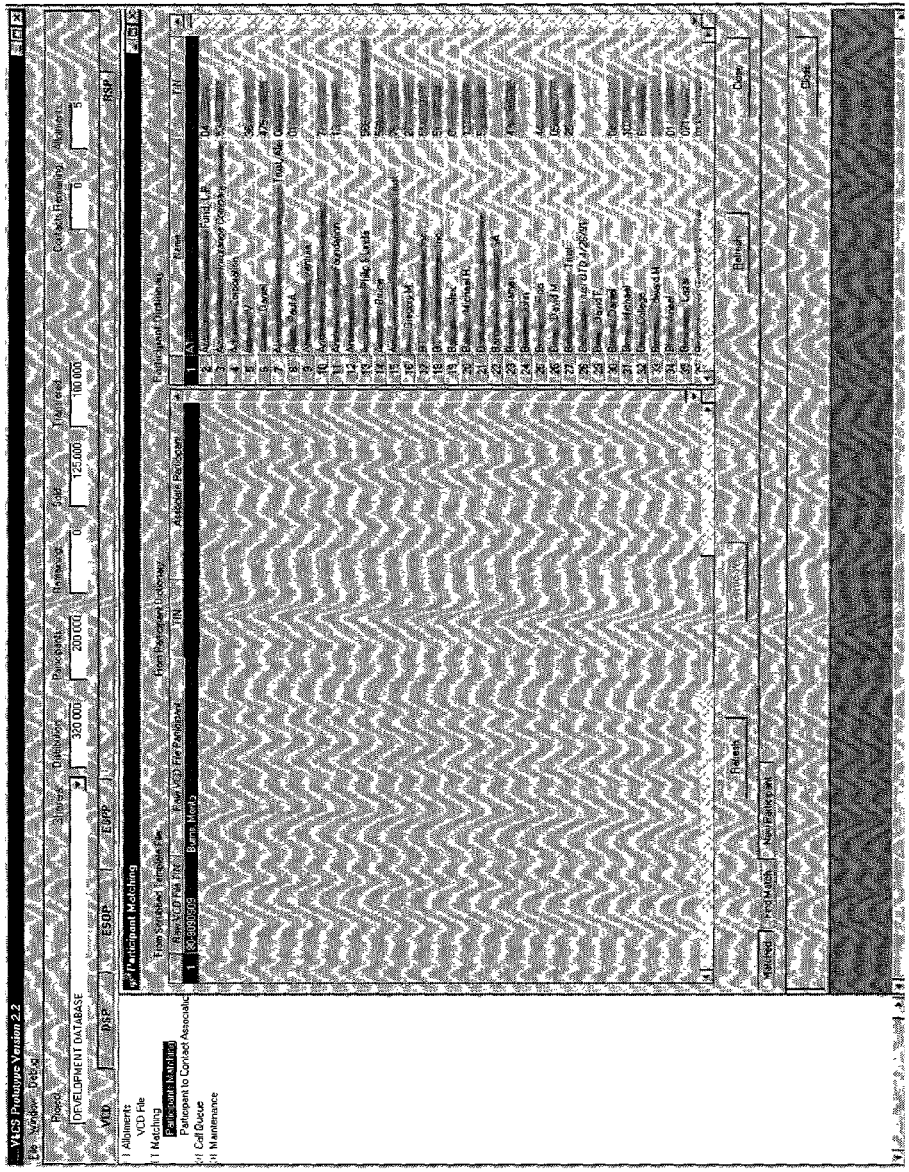
Figure 7C:
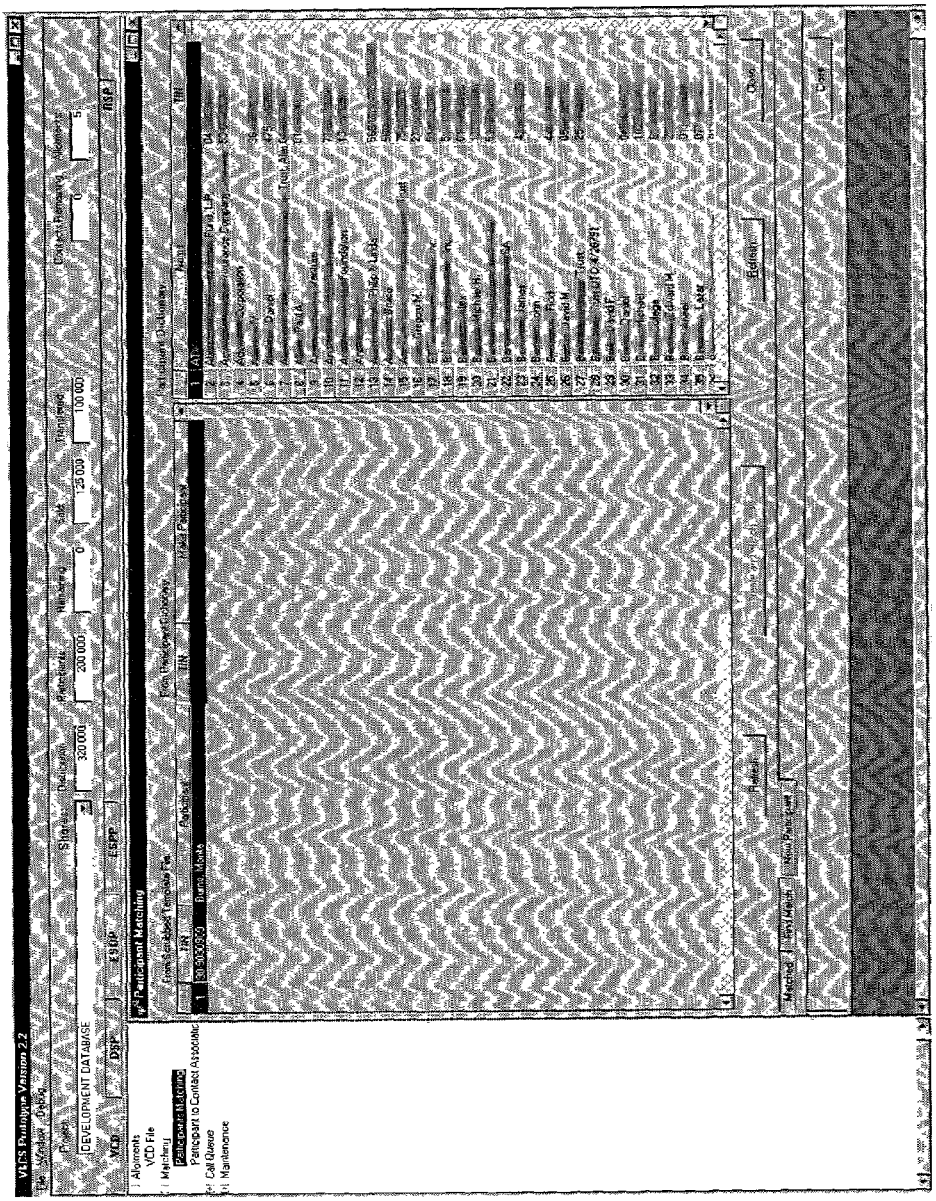

FIG. 7a is a sample participant matching screen showing those participants which have been matched, either automatically, or via manual processes. Preferably, when this screen is first opened by a user, an automatch process is automatically triggered. FIG. 7b is a sample participant matching screen which shows participants which have yet to be matched and for which manual matching may be possible, as, for example, when a VC participant is already defined in the system but the VC data does not include a TIN. If no match to an existing record can be made, a new participant entry can be created. User input may be required to supply missing information. A sample new participant screen is shown in FIG. 7c.

After all of the VC participants have been matched or new participant records created, each participant must be associated with a contact from which instructions regarding the disposition of the distribution to the participant can be obtained. The contact can be an assistant or an accountant to the participant, or the participant themselves. In addition, a contact can be associated with multiple participants. Preferably, contact access information, such as phone numbers and email addresses, are associated with each contact and a history of contact interaction for the project is maintained.

Figure 8:
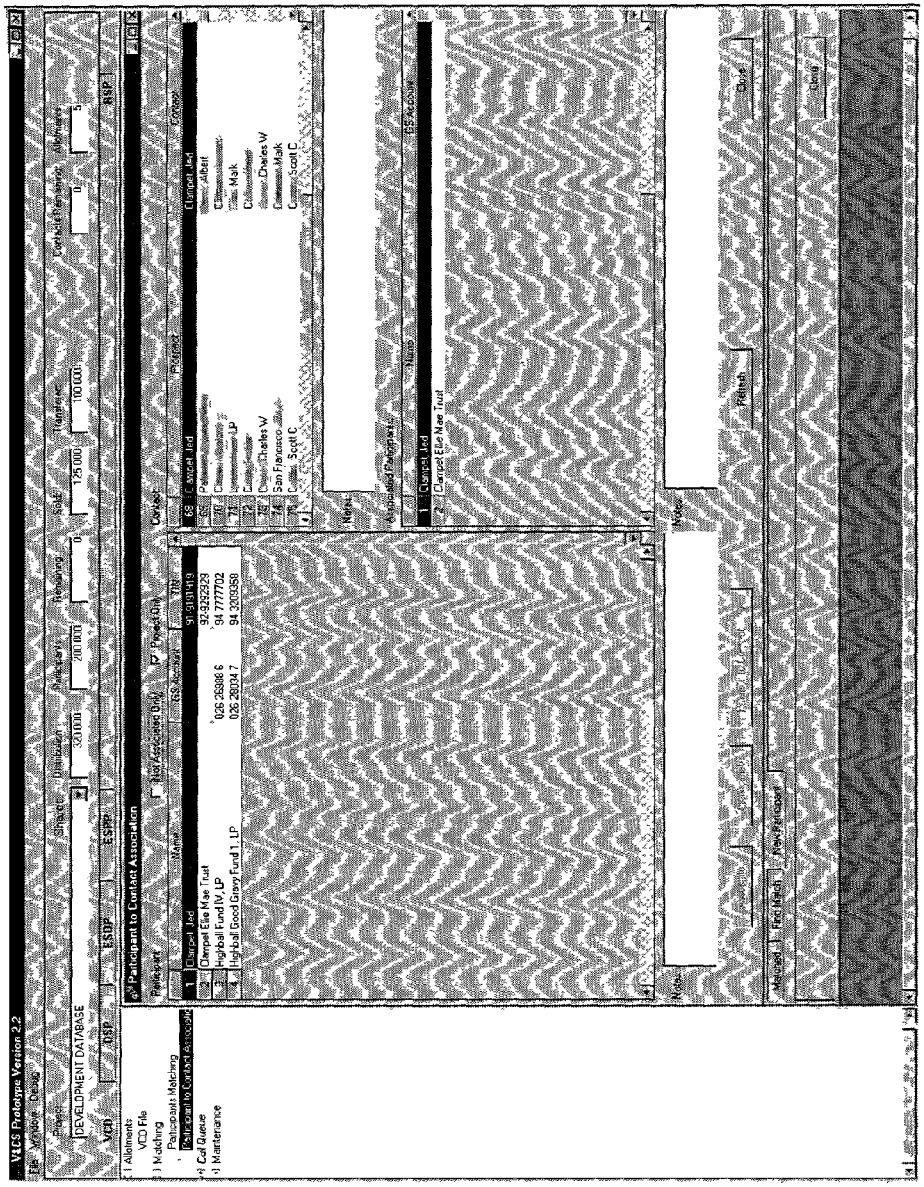
FIG. 8 is a sample participant to contact association screen.

Participant-contact association can be performed in an automated or semi-automated manner with the aid of a participant-contact association screen 510. A sample participant—contact association screen from which a system user can associate participants to contacts is shown in FIG. 8.

During the course of operation, information in the CS database 410 may need to be updated. For example, participant telephone numbers can change, spellings may need corrections, and other reference data may need updating, such as in response to the receipt of a W-9 form from an existing participant. Similar updates may be necessary for contact data, as well as for information concerning the project and any restrictions which may be in place, such as those due to various SEC or other government regulations on the allotments or on the individual due to affiliate or contractual restrictions. Various mechanisms can be provided to permit the database contents to be updated as needed.

Figure 9A:
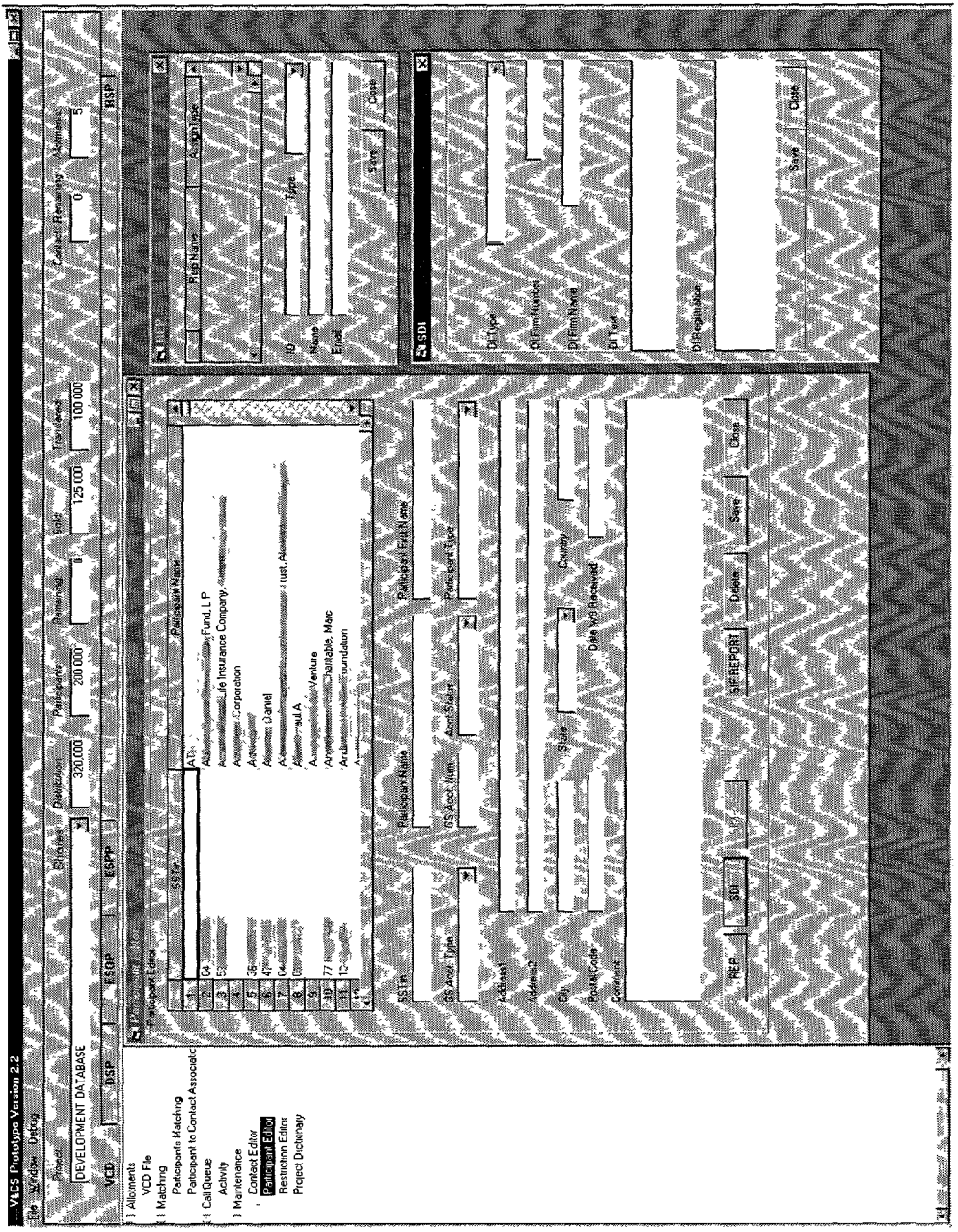
FIGS. 9a-c are sample data editing screens.
Figure 9B:
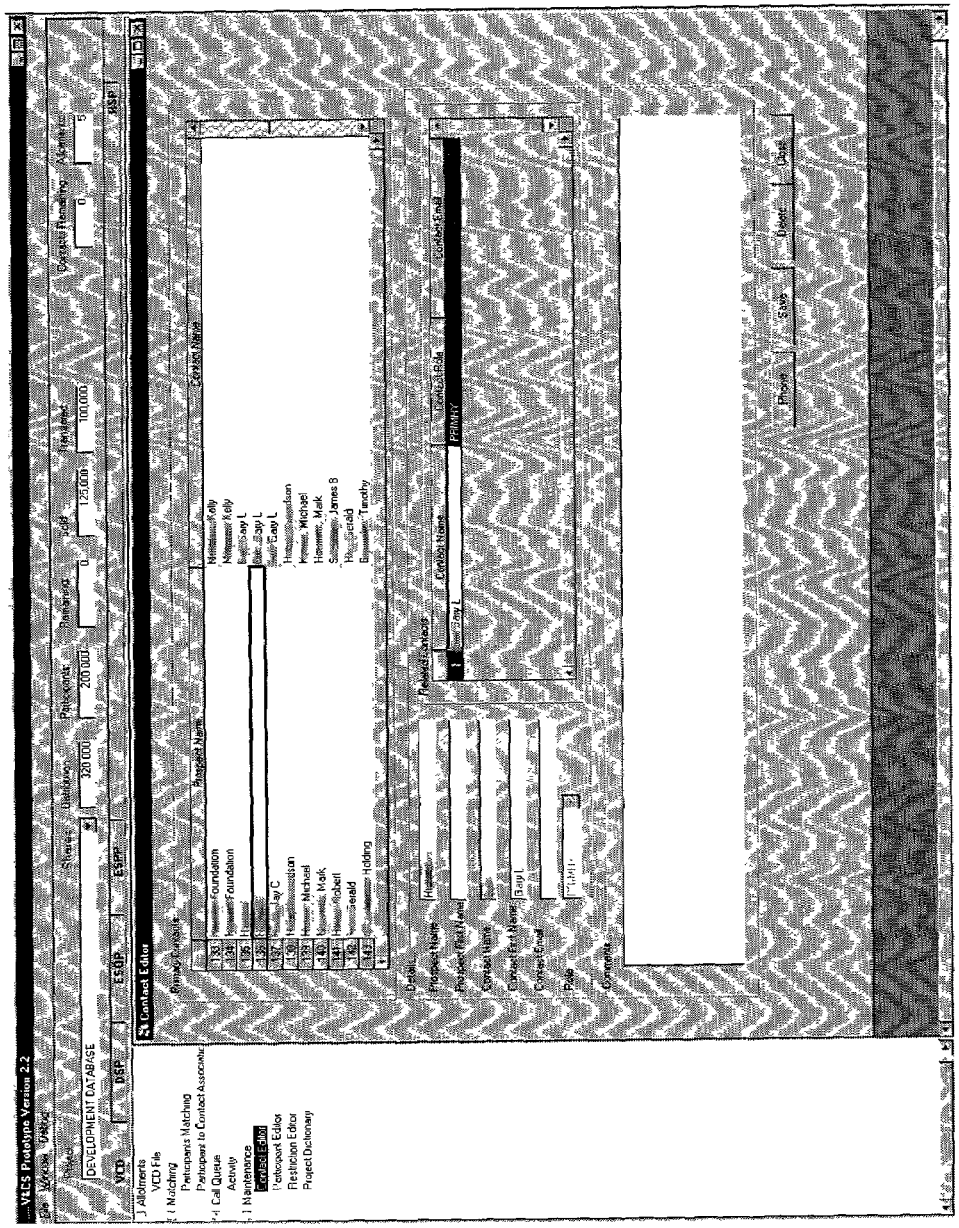
Figure 9C:
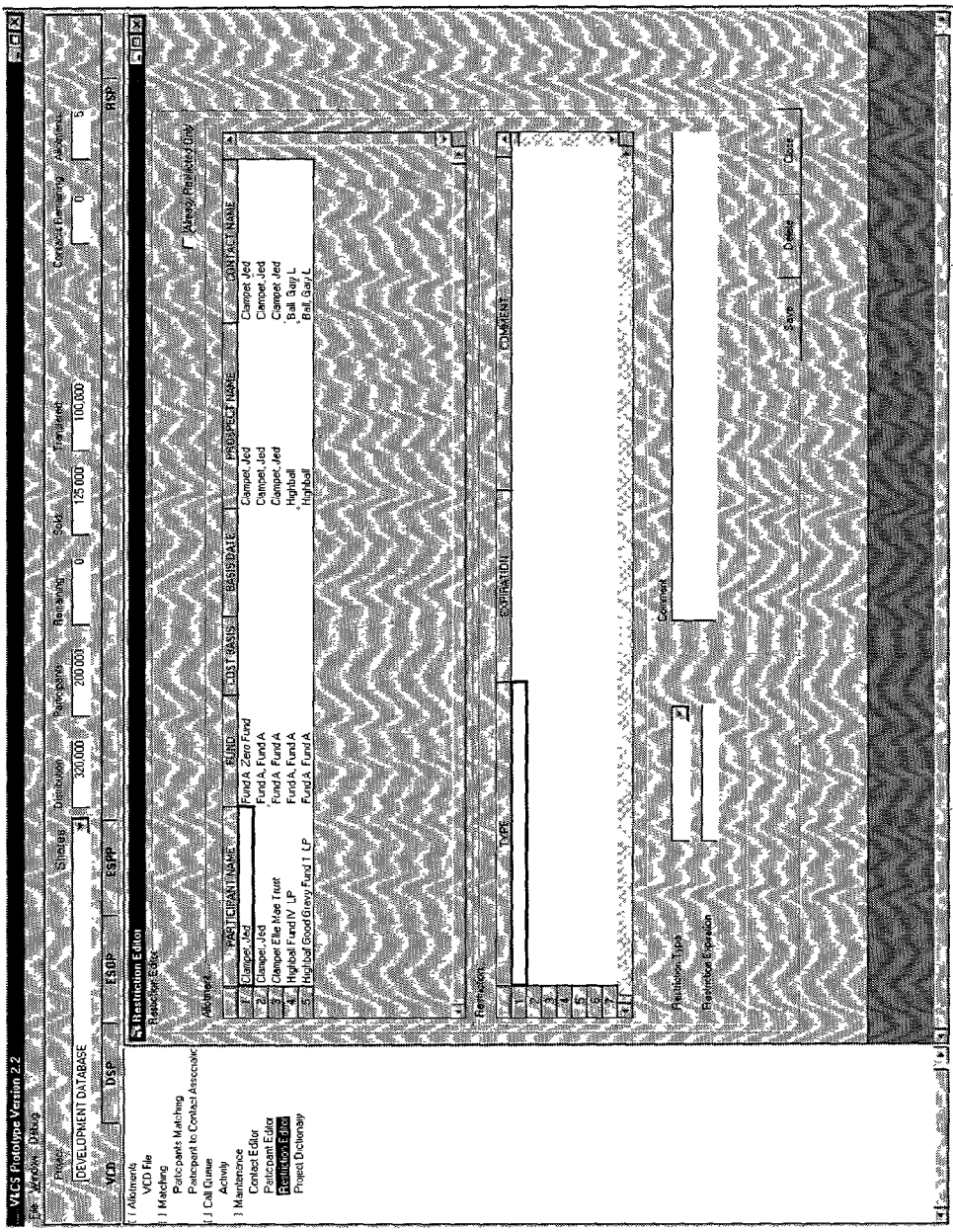

Preferably, separate data editing screens 512 are provided for each major internal database table or data category to which updates can be made. For example, FIG. 9a is a sample participant editor screen from which participant reference data can be captured. Fields are also provided to enter an assigned sales representative and standing or default delivery instructions. Similarly, FIG. 9b is a sample contact editor screen which can be used to capture reference data for a contact table and FIG. 9c is a sample restriction editor screen which can be used to define legal restrictions on the number of shares that are allocated to a participant as part of a given distribution.

Figure 10:
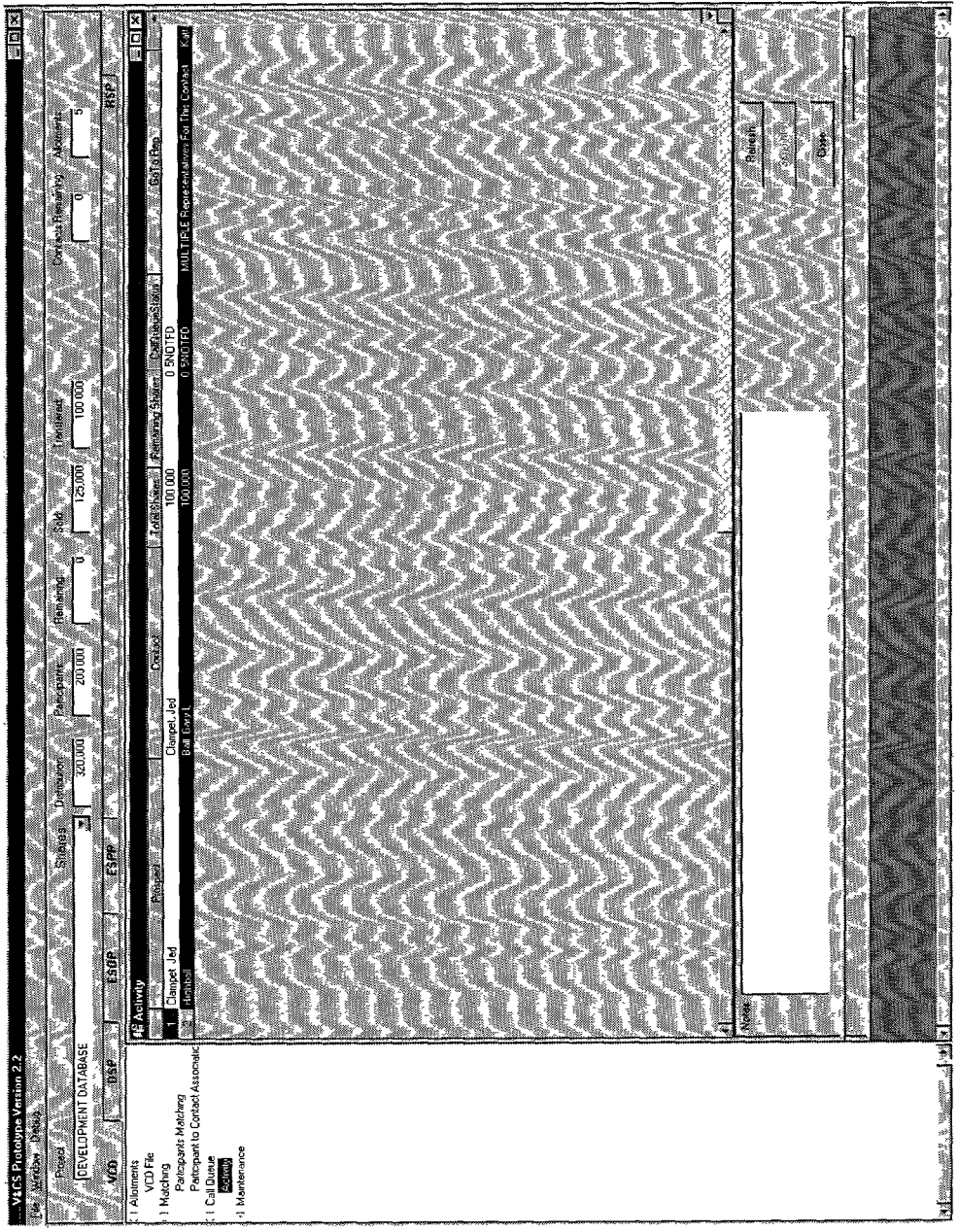
FIG. 10 is a sample call queue screen.

Once the VC spreadsheet 502 is imported, matched, and all of the participants are assigned to contacts, a Call Queue 514 can be activated. The Call Queue is a dynamic view of the contacts for participants and associated status, preferably shown in a format where the priority and actions required are indicated by the position and color of the record. A sample Call Queue is illustrated in FIG. 10.

Each record shown in the Call Queue corresponds to a contact from which distribution instructions for one or more participants must be obtained. The Call Queue provides a centralized list of all open items for which a contact for a participant must be contacted, e.g., by a representative of the facilitator, to get instructions for a distribution. If one or more particular representatives have been assigned to a given contact, that information can also be listed in the Call Queue. Alternatively, or in addition, the Call Queue displayed to a particular user can be filtered to indicate only those contacts which can properly be made by the given representative. Advantageously, the Call Queue display is not a static list, but instead is dynamically updated to indicate the status. The Call Queue can be configured to display contacts associated with one or more specified projects. Alternatively, the Call Queue can be configured to display contacts associated with all projects to provide an indication of all open items and to facilitate client call-in situations where the project (or projects) may not be specifically known to the operator.

Figure 11:
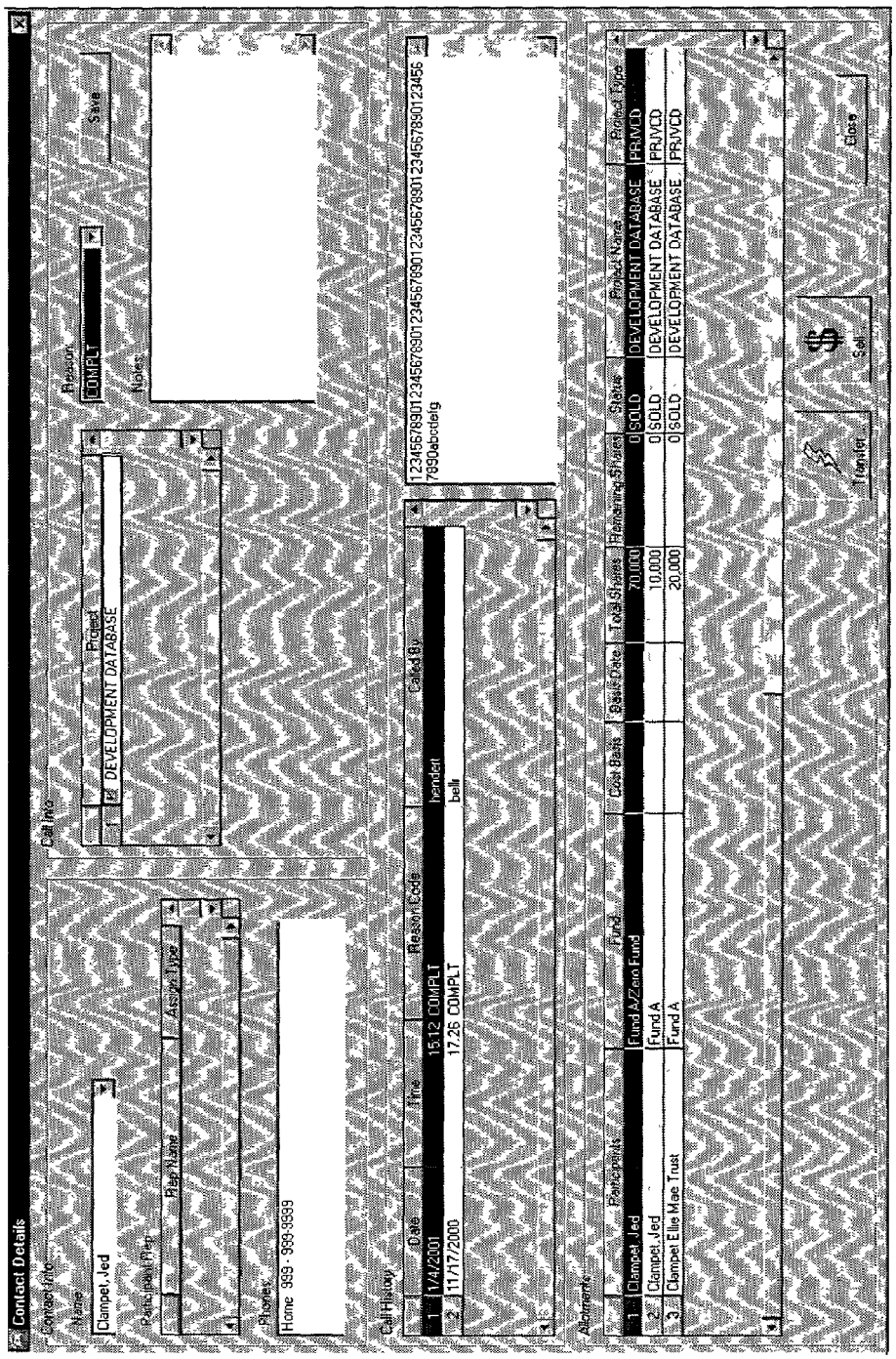
FIG. 11 is a sample contact detail screen.

When a row in the Call Queue is selected, a contact detail screen 516 can be launched. A sample contact detail screen is shown in FIG. 11. The contact detail screen preferably shows all business the facilitator has with a particular client and indicates which items are open for the associated participants. The user can enter comments regarding attempts to reach the contact, review the allotment breakdown for the contact, and determine the status of transfers and sales.

The source data for the contact detail screen can include not only the distribution at issue but also other distributions or activities which are being managed or processed by the facilitator. When a contact is responsible for multiple participants, at least the open items for each associated participant are indicated in the contact details. In addition, where a single participant is involved in multiple distributions or other activities for which instructions are required, the various action items for that participant can also be displayed. As a result, when an operator selects a given contact, they can easily determine all information which must be obtained from the contact for all of the associated participants and for each ongoing distribution. Preferably, when a user opens a Call Queue entry, that item is locked to prevent other users from simultaneously attempting to reach a contact or enter instructions from the LP participant for that record set.

Advantageously, this combination of information for various projects and participants allows all required information from a given contact to be obtained in a single call, thus eliminating or greatly reducing the occurrence of multiple calls to a contact to solicit instructions and simplifying the process of determining what information must be obtained and from where.

As discussed above, Call Queue entries can be displayed in a format which indicates the status of the various users and simplifies determinations regarding which entries need action and which entries are complete. Preferably, contacts with the most urgent items or for which new information items have been associated are listed at the top of the list and completed entries are moved to the bottom. Users can preferably also re-sort the Call Queue as desired and indicate that items from specified active projects be displayed. For example, when no action has been taken to reach a contact, that record can be shown in white. When communication with a contact has been made but open items still remain, the record can be shown in gray and, if no additional communication with the contact is required, the record can be shown in black. Locked or open items can be displayed in yellow. Other alternative color and sorting schemes can also be used.

In addition to allowing users to capture comments and adjust the status of the contact, the contact detail screen also provides mechanisms to record the instructions for a given participant provided by the contact. For example, the stock distributed to a given participant is to be retained by the facilitator, this information can be indicated in the contact detail screen. Preferably, however, if the stock is to be sold or transferred, separate sale and transfer screens 518, 520 are provided to capture the required information, which screens can be launched from the contact detail screen. In FIG. 11, the contact details screen has transfer and sell screen launch buttons. Other launch mechanisms can also be used.

Figure 12:
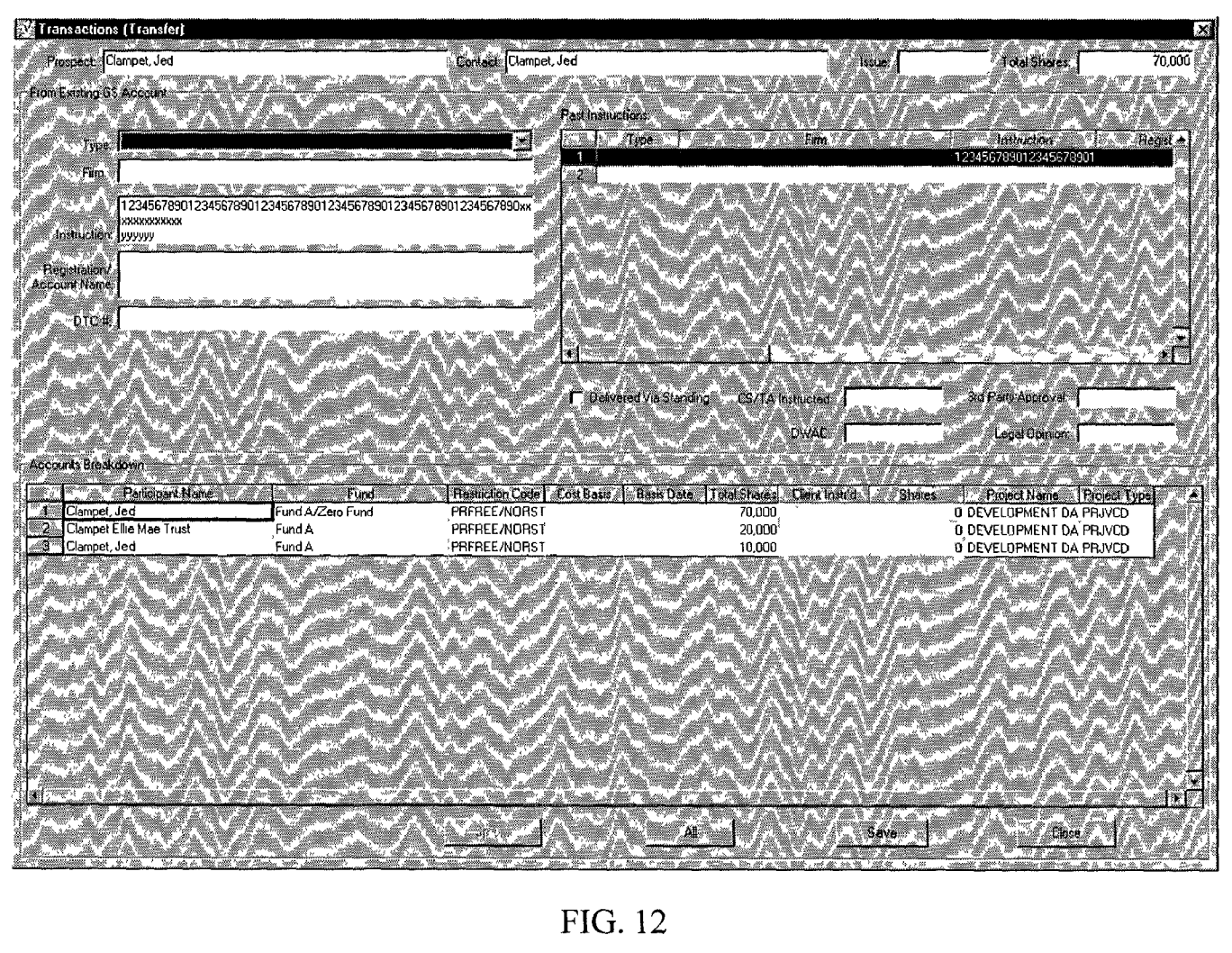
Figure 13:
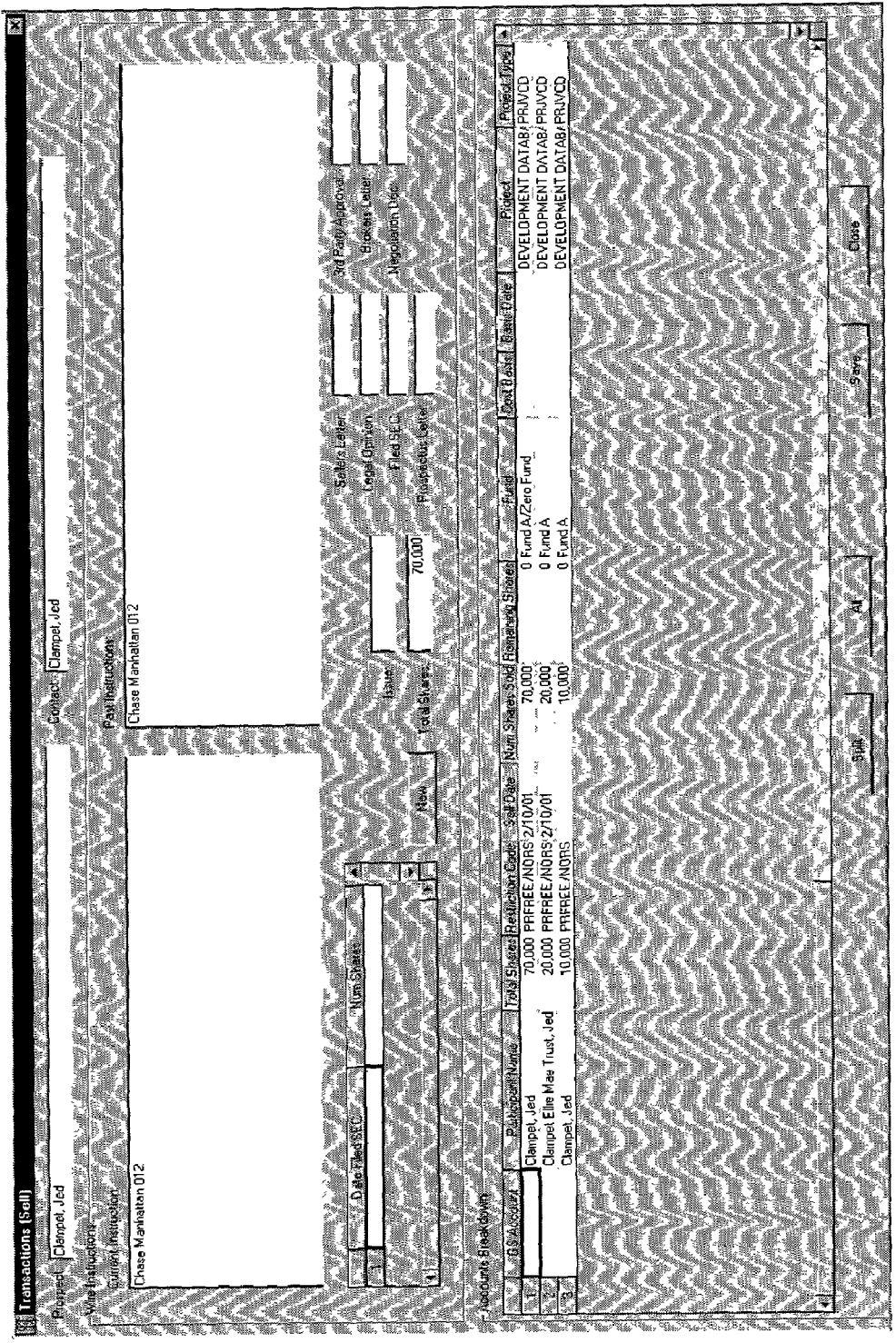
FIG. 13 is a sample sales screen.

Sample transfer and sales screens are shown in FIGS. 12 and 13, respectively. In general, the transfer screen provides functionality to capture instructions regarding delivery of the security and the sale screen provides functionality to capture sale instructions. Typically, proceeds of sales are returned by wire and the instructions are captured in one or more simple data fields into which the user can enter information concerning routing of any proceeds of the sale to the desired user account. Depending on the implementation, a selling participant may need to have an account with the facilitator in order to execute a sell.

Preferably, histories of sale and transfer instructions provided by participants are maintained and the historical instructions are displayed or otherwise accessible in the sale, transfer, or contact detail screens. To simplify data entry, when the user selects a particular historical instruction, e.g., by clicking on the appropriate history rows, the historical instructions are used to populate the current instruction entry fields. Since wire and delivery instructions tend to be used repeatedly, this mechanism increases efficiency and reduces the likelihood of data entry errors.

As discussed above, standing delivery instructions can be defined for a participant, e.g., by using an appropriate data editing screen. Preferably, if a participant has standing delivery instructions, when the transfer screen 518 is opened for that participant, a historic delivery grid will show prior delivery instructions which have been provided and/or the default instructions at the top of the list. The text can be in bold type for emphasis. The user can then be permitted to select the standing delivery instruction, another historical instruction provided by the participant, or enter a new delivery instruction.

Transfer restrictions (such as defined using the restriction editor) can be used by subsequent screens and modules, such as the transfer screen 518, the sale screen 520, and the participant instruction report module 522, shown in FIG. 5 and discussed below. In particular, the transfer, sale, and distribution of a security can be affected by restrictions which are in place. Accordingly, when these functions are activated, restriction data related to the allotment of shares for the participant at issue is displayed or output and the user can be prompted to populate certain additional fields related to the restriction as appropriate. For example, "144 securities" must be filed with the SEC before they are sold. A user interacting with the sale screen would see the 144 restriction code and know that an appropriate SEC filing grid must be populated. If the restriction code was not a code that required filings, the user could ignore the 144 code.

Returning to FIG. 5, in addition to the various data input and editing screens, a participant instruction report system 522 is also provided. The report module 522 is configured to generate electronic data files, sets, or spreadsheets of incremental distribution instructions 524 which can then be provided electronically or in physical form to a TA having custody of the securities to be distributed. The report file can be generated on-demand, on a periodic basis, such as every night, or even each time instructions from a participant have been received. Preferably, the reports are incremental in nature and include only those instructions which have not previously been supplied to the TA. If the TA is managing multiple distributions, a single report containing instructions for participants in any distribution can be provided or separate reports can be generated for each active distribution. The format of the instructions 524 provided to the TA may be implementation dependent. As a result, the report format produced by the database interface system may need to be reformatted or edited as appropriate.

Advantageously, report generation can be performed automatically and the report electronically transmitted to the TA. Thus, the TA will continually receive new instructions and can act on them immediately, thereby minimizing delay. If discrepancies or errors are noted by the TA for a given participant, verified instructions can be processed and the detected errors resolved by communication with the facilitator, indicated contact, and/or participant without stopping the entire distribution.

FIG. 6 illustrates a preferred set of database tables and linkages between tables for the CS database 410. These tables include four major clusters—Allotment, Participant, Content, and Project. The Allotment cluster comprises the Allotment, ClientServices, Trans, SecFiling, and Restriction tables. These tables are the central focus of the VCS system and are used to define all elements of work that must be performed and the results of doing those tasks. The remaining tables contain reference data, historical, or other data. The Participant cluster comprises the Participant, ParticipantRep, and StandingDelivery tables and is used to store individual account level reference information. The Contact cluster comprises the Contact, ContactActivity, ActivityProject, and ContactPhone tables and is used to store abstract contact reference information. Finally, the Project cluster is comprised of the Project, Security, VCFirm, and VCFund tables which are used to store information about specific projects, instruments, and VC firms. Other database layouts and information distributions are also possible.

In accordance with a further aspect of the invention, a novel block trading management system can be provided. The block trading management system can also be used for distributions by parties other than a VC. The system is preferably not limited to the transfer of restricted securities, but is more broadly applicable.

During a VC, corporate, or other share or security distribution, it is not uncommon for many participants in the distribution to want to sell the securities. Often each participant instructs their facilitator or broker to sell the shares when the share price peaks. Traditionally, each participant acts individually in their sale, resulting in a sales spike in the market place which can cause price depression for parties whose sells are executed later in the cycle.

To avoid price depression, the shares of all participants who want to sell can be aggregated in a singe block for sale. Preferably, when a participant in a distribution indicates that they would like to sell their shares, the system determines if there is a block sale which is associated with that distribution. If there is an associated block sale, the customer is given the option to participate and can designate a number of shares to contribute. Block sales can be held publicly but preferably are private sales which do not therefore immediately effect the public market price. A block can be sold in a single transaction, or sold in portions of varying size and at different times and prices. To support such block sales, a block trading management system can be provided to keep track of the contributions to the block made by each of the participants and to manage the allocation of proceeds to the participants based upon the number of shares they have contributed and the average block sales price.

In one implementation, allocation of the sale proceeds is delayed until after the entire block has been sold. Once the sale is compete, an average share sale price is determined and the proceeds distributed to each participant in accordance with the computed average price and the total number of shares contributed by the participant.

In an alternative implementation, allocation of the proceeds can be incremental. After each portion of the block has been sold, each participant who has contributed to the block prior to that sale can receive an allocation based on (a) the percentage of the block which has been sold at the price of that sale, and (b) the percentage of shares contributed by the participant present in the block at the time of sale. The total number of shares for the participant in the remainder block is reduced accordingly. This process continues until all the entire block has been sold.

In a conventional distribution, instructions for all participants must be received in advance of any distributions being performed by the TA. However, in an incremental distribution in accordance with the present invention, or other situations where sell instructions may be provided on an incremental basis, participants may want to be included in the block sale even after the sale has commenced. For example, for various reasons, a block sale may be commenced before all of the participants in a VC distribution have been contacted by the facilitator and provided distribution instructions. Preferably, such late-coming participants are permitted to be included in the sale. The shares contributed by latecomers can be added to the block at an appropriate time and the distribution of proceeds delayed or provided incrementally as desired and as described above. As a result, late corners can benefit fully from the benefits of the block sale without being penalized because, for example, they appeared at the end of the list of participants to be contacted by the facilitator, and therefore did not receive early notice of the distribution.

Various mechanisms can be used to keep track of the number of shares which have been contributed to a block, when the contribution was made, and, with reference to the size and price of sales made during the block sale, to determine the appropriate allocation of proceeds to the participants. Such mechanisms will be known to those of skill in the art and can be incorporated in the system for providing incremental restricted security distribution instructions disclosed above.

While the invention has been particularly shown and described with reference to preferred embodiments thereof, it will be understood by those of skill in the art that various changes in the form and details may be made without departing from the spirit and scope of the invention. In particular, while the invention has been discussed with regard to the distribution of physical restricted stock from venture capitalists, the methods and systems of the invention can also be used for Venture Capital distribution of other securities, and particularly, securities which must be represented at one or more stages in the distribution as physical certificates. In addition, the distributions can be from various other types originating parties.

It should also be noted that while the term "transfer agent" has been used throughout, such an entity is not limited in scope to a conventional "transfer agent" as it may be generally understood by those of ordinary skill in the M. Instead, this term should be understood as encompassing other entities to which custody of the physical securities is given and which can perform the which perform the distributions as described above and recited in the claims, even if such an entity would not be considered a "transfer agent" in other contexts.

The invention claimed is:

1. A method for providing restricted security distribution instructions to a transfer agent in a distribution of securities from a Venture Capitalist to a plurality of participants comprising:
   receiving distribution information from a Venture Capitalist ("VC") in electronic form, the distribution information including data indicating for each participant in the distribution a name, an identification number, and a number of allocated securities;
   importing the distribution information into a database system;
   matching participants identified in the distribution information to participant information previously entered in the database system;
   associating each respective participant in the distribution information with a contact from which instructions regarding a disposition of the allocated securities to each respective participant can be obtained;
   indicating a plurality of contacts to be contacted to obtain distribution instructions for associated participants;
   sorting the plurality of contacts in an order of urgency;
   contacting the plurality of contacts in order of urgency to obtain the distribution instructions, such that contacts associated with more exigent items are contacted before contacts associated with less exigent items;
   storing the distribution instructions received from the plurality of contacts in the database system;
   generating a report including received distribution instructions for the participants in the distribution; and
   providing the report to a transfer agent.

2. The method of claim 1, further comprising the step of scrubbing the received information prior to the importing step.

3. The method of claim 1, wherein the step of matching participants comprises the steps of:
   identifying previously stored records in the database system containing matching identification numbers;
   indicating differences between data in identified records and the distribution data received from the VC; and
   indicating participants in the distribution for which no matching previously stored record was found.

4. The method of claim 1, further comprising the step of defining distribution restrictions for a particular participant.

5. The method of claim 1, wherein the step of indicating comprises the step of dynamically indicating the plurality of contacts for participants in the distribution and a contact status for the indicated contacts.

6. The method of claim 1, further comprising the step of upon the selection of an indicated contact indicating all open items for which the contact must be contacted.

7. The method of claim 1, wherein the contacting comprises directing a human operator to manually contact the plurality of contacts.

8. The method of claim 1, further comprising:
determining if a block sale of securities is associated with the distribution;
locating one or more participants in the distribution who wish to sell at least some of their securities from the distribution; and
affording the one or more participants an option to designate a number of their securities to be sold in the block.

9. The method of claim 1, wherein the step of generating is performed in response to the receipt of distribution instructions for at least one participant.

10. The method of claim 1, further comprising:
granting the transfer agent custody of the allocated securities for at least a limited period of time, wherein the allocated securities are associated with corresponding participants, and further wherein the transfer agent is configured to perform incremental distributions of the securities in accordance with the distribution instructions.

11. The method of claim 8, further comprising:
tracking the number of securities designated by each of the one or more participants to be sold in the block; and
calculating an allocation of proceeds to each of the one or more participants based on the number of securities designated by each of the one or more participants to be sold in the block multiplied by an average block sales price per security.

12. A system for generating restricted security distribution instruction reports suitable for use by a transfer agent in a distribution of securities from a Venture Capitalist to a plurality of participants, the system comprising:
at least one computer system associated with a facilitator;
a database accessible by at least one client computer system;
a database import module configured to import into the database distribution information received from an originating entity in electronic form, the distribution information including data indicating for respective participants in the distribution a name, an identification number, and a number of allocated securities;
a participant matching module configured to match participants identified in the distribution information to participant information previously stored in the database;
a participant contact association module configured to associate each participant in the distribution with a contact from which instructions regarding the disposition of the securities allocated to the participant can be obtained;
a call queue module configured to indicate a plurality of contacts to be contacted to obtain distribution instructions for associated participants and sort the plurality of contacts in an order of urgency with contacts associated with more exigent items coming before contacts associated with less exigent items;
a contact module configured to facilitate contact of the plurality of contacts in the order of urgency and procure the distribution instructions;
at least one disposition module configured to store distribution instructions received from the plurality of contacts; and
a participant instruction report module configured to generate a report including received instructions for the participants, the report suitable for electronic transfer to the transfer agent.

13. The system of claim 12, further comprising a scrubbing module configured to format the received information and to verify that required data fields are present prior to processing of the received information by the import module.

14. The system of claim 12, wherein the participant matching module is configured to:
identify previously stored records in the database containing matching identification numbers;
indicate differences between data in identified records and the distribution data received from the originating entity; and
indicate participants in the distribution for which no matching previously stored record was found.

15. The system of claim 12, wherein the call queue module is configured to dynamically indicate contacts for participants in the distribution and a contact status for the indicated contacts.

16. The system of claim 12, further comprising a contact detail module configured to, upon the selection of an indicated contact, indicate all open items for which the selected contact must be contacted.

17. The system of claim 12, wherein the contact module is configured to prompt a human operator to contact the plurality of contacts and procure the distribution instructions.

18. The system of claim 12, wherein the disposition module is further configured to allow a human operator to manually enter the distribution instructions procured from the plurality of contacts such that the distribution instructions can be stored.

19. The system of claim 12, wherein the participant instruction report module is configured to generate a report in response to the receipt of instructions for at least one participant.

20. The system of claim 12, wherein the participant instruction report module is configured to generate incremental reports.

21. The system of claim 12, wherein the database comprises a plurality of tables including tables forming:
an allotment cluster configured to store information related to distribution tasks to be performed by the facilitator;
a participant cluster configured to store individual account level reference information;
a content cluster configured to store contact reference information; and
a project cluster configured to store information related to specific security distribution projects.

* * * * *